United States Patent [19]

Snodgrass

[11] Patent Number: 4,810,545

[45] Date of Patent: Mar. 7, 1989

[54] SCORING DIE MATRIX

[76] Inventor: Francis M. Snodgrass, 527 Clifton Dr. N., St. Annesion Sea, Lanes, United Kingdom, F48 2QU

[21] Appl. No.: 58,838

[22] Filed: Jun. 5, 1987

[30] Foreign Application Priority Data

Jun. 6, 1986 [GB] United Kingdom ................. 8613848

[51] Int. Cl.[4] ........................... B32B 3/02; B32B 3/12

[52] U.S. Cl. ........................................ 428/43; 428/120

[58] Field of Search ............................. 428/40, 43, 120

[56] References Cited

U.S. PATENT DOCUMENTS 2,838,421 6/1958 Sohl .................................. 428/40 X 4,522,854 6/1985 Sharps .................................. 428/43

4,647,485 3/1987 Nelson ................................. 428/43

*Primary Examiner*—Alexander S. Thomas

*Attorney, Agent, or Firm*—Steinberg & Raskin

[57] ABSTRACT

A scoring die matrix comprises an extruded strip having two portions, a matrix portion and a locator portion. The base of the matrix portion has a layer of adhesive applied thereto and a cover paper, preferably a silicone release paper, covering the adhesive. The region of the join between the locator portion and the matrix portion is partly cut through. The matrix is extruded in one piece and applied to the scoring press where the adhesive ensures that the matrix portion adheres thereto. The locator portion is then removed therefrom by pulling where it will tear away at the partly cut through weakened portions.

9 Claims, 1 Drawing Sheet

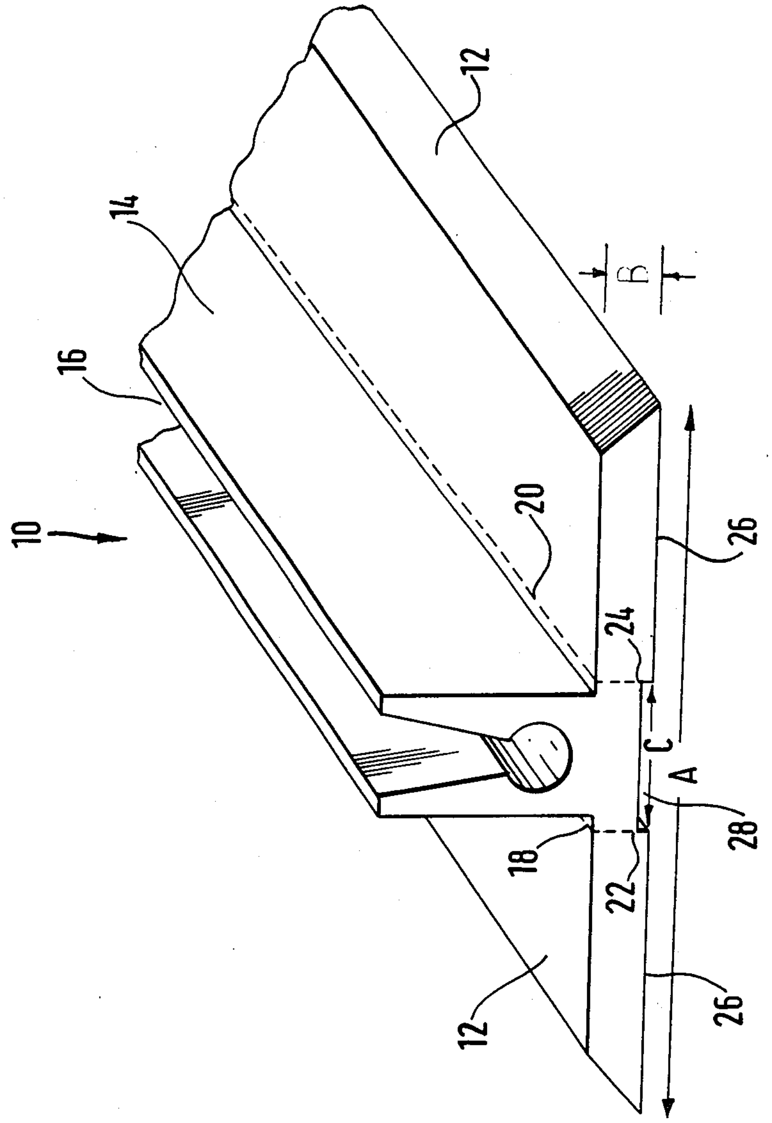
12
14
16
10
B
20
26
24
C
A
28
18
22
26
12

SCORING DIE MATRIX

BACKGROUND OF THE INVENTION

This invention relates to a scoring die matrix such as for use in forming creases or score lines in cardboard carton blanks.

Cardboard or other card like material for forming, for example, carton blanks, is creased or scored to facilitate folding into its final shape by pressing it between a creasing rule of a cutting and creasing press and a creasing matrix strip. The matrix strip is a long flexible strip having a longitudinally extending channel formed therein which is slightly wider than the creasing rule and which is aligned with the creasing rule edge so that on closing the press, the rule edge urges the portion of the card to be creased into the matrix channel thereby providing a well defined crease. It will be appreciated that the matrix channel must be precisely aligned with the edge of the creasing rule.

One such matrix assembly is disclosed in my U.K. Patent No. 1474022. The disclosed matrix assembly comprises a flexible plastic strip having a channel formed along its longitudinal axis to cooperate with the creasing rule and a separate, flexible plastic locator strip. The locator strip has a slit formed along its longitudinal axis adapted to engage the creasing rule, and the matrix strip and locator strip are firmly removably bonded to one another with the slit aligned with the channel. An adhesive layer is provided on the base of the matrix strip. In use, the slit in the locator strip is fixed to the creasing rule of the cutting and creasing press and the latter is then advanced towards the press cutting plate in order to press the matrix assembly against the cutting plate where the adhesive layer on the base of the matrix strip then retains the strip on the cutting plate. The locator strip can then be separated from the matrix strip to leave the matrix strip on the cutting plate in alignment with the creasing rule.

The above system works well in practice but depends on two adhesive bonds, namely, a first bond between the locator strip and the matrix strip, and a second bond between the matrix strip and the cutting plate. The second of these bonds must be stronger than the first to enable the locator strip to be removed from the matrix strip when the latter is in place on the cutting plate without removing the matrix strip from the cutting plate.

SUMMARY OF THE INVENTION

It is an object of the invention to provide a new and improved scoring die matrix which is simpler, consistently more accurate and less expensive in construction than conventional systems.

Briefly, in accordance with the present invention, this as well as other objects are attained by providing a scoring die matrix which comprises a unitary extruded strip having two portions, a matrix portion and a locator portion, the base of the matrix portion having a layer of adhesive and a cover paper, and the join regions between the locator portion and the matrix portion being partly cut through or weakened.

With the matrix of the invention, both the locator and matrix portions are extruded as a single strip. By the use of slitting, scoring or perforating rollers the locator portion may be partially cut from the matrix portion. It will be understood that in this case the locator portion is not completely cut from the matrix portion or the extruded strip would fall apart. Rather, the matrix and locator portions are left attached to one another either by thin continuous webs of the extruded material or by perforated webs of the extruded material. Alternatively, the join regions may be weakened by forming the thin webs during the extruding operation. In either case, the web that remains should be easily ruptured enabling the locator portion to be removed from the matrix portion once the matrix is in place on the cutting plate of the press.

The strip may be extruded from any suitable plastic material, such, for example, as ethylene vinyl acetate, acrylo nitrile butadiene styrene, copolymers of ABS and styrene acrylo nitrile (SAN), polypropylene, polyvinyl chloride, or the like. In order that the matrix strip should have the necessary mechanical qualities it is currently preferred to use an ABS copolymer.

The matrix strip may be used as extruded or may be joined, either during the extruding process or subsequently, to a metal foil base but preferably is used as extruded without a metal foil base. Either way, once formed, the strip is then provided with an adhesive coating on the base thereof which subsequently is covered by a cover, for example, of release paper such as a silicone release paper. Where the strip is used as extruded, it is preferred that the adhesive coating cover only the matrix portion of the strip and avoid the base of the locator portion to prevent the latter from adhering to the cut and press plate. The adhesive may be applied directly to the base of the matrix or may be in the form of a double sided adhesive strip on a central tissue or carrier, for example a Mylar carrier.

DESCRIPTION OF THE DRAWINGS

The invention will be described further, by way of example, with reference to the accompanying drawing, in which the sole FIGURE is a partial perspective view of a die matrix in accordance with the invention.

DESCRIPTION OF THE PREFERRED EMBODIMENTS

Referring now to the drawing, an extruded die matrix strip, generally designated 10, comprises matrix portion 12 and a central locator portion 14 extruded as a single unit from a suitable polymer, such as ABS. The locator portion 14 includes a tapered slit 16 shaped and dimensioned to receive the rule edge of a creasing rule in the same way as described in the above-mentioned U.K. Patent No. 1474022. After extrusion, the strip 10 is operated on by a pair of slitting rollers which are set precisely to score through the join regions of the matrix and locator portions at 18 and 20. The slitting rollers each make a plain cut by which thin webs 22 and 24, for example one or two thousanths of an inch thick, are left joining the matrix portion 12 and locator 16. Alternatively, the slitting wheels may be saw-toothed so as to leave perforated webs which may be of somewhat greater thickness than webs 22 and 24. The slitting and/or perforating can be carried out from the top, as described, or from the bottom of the strip 10.

The distance between the cuts 18 and 20 is set precisely since this will be the width 'C' of the channel in the matrix when in place on the cutting plate. The lower limit of channel width is determined by the width of the locator portion 14 and, the ability of positioning the slitting rollers immediately adjacent the portion 14, whereas the upper limit depends only on the width 'A' of the matrix portion 12.

The lower surface or base 26 of the matrix portion 12 is coated with a suitable adhesive, either directly or by means of a double sided adhesive tape. The lower adhesive surface is then coated with a suitable release paper as is known from conventional matrix strip constructions. In order to support the strip 10 it is preferred that either the double sided adhesive strip if used, or the cover paper, is of heavier quality than usual so as to provide some structural rigidity to the strip after perforation or scoring.

The matrix of the invention is used in a conventional manner, such as described in the above-mentioned U.K. Patent No. 1474022. The slit 16 in the locator portion 14 is placed on the creasing rule edge and the rule is advanced towards the press cutting plate in order to press the matrix assembly against the cutting plate after having first removed the cover strip from the adhesive. The adhesive layer on the base of the matrix strip then retains the matrix strip on the cutting plate. The locator portion 16 can then be separated from the matrix portion 12 to leave the matrix strip on the cutting plate in alignment with the creasing rule with a channel of width 'C' defined between the cuts 18 and 20. As illustrated, the lower surface of the locator portion 16 does not extend downwardly as far as the lower surface of the matrix portion 12 thereby defining a recess 28 which eventually constitutes the base of the channel. This configuration is useful when the adhesive strip applied to the base 26 of the matrix portion 12 is continuous over the entire width 'A' of the matrix portion 12. If adhesive is to be applied only to the lower surface 26 of the matrix portion 12 and not to the lower surface of the locator portion 16, then the base of the locator portion 16 can be flush with the base 26.

By providing the cover strip for the adhesive of heavier than normal paper, for example a craft paper backed silicone liner, it is possible to use a haul-off operation to draw the extrusion through the line. The completed matrix would be cut to length at the end of the haul-off.

The one piece matrix of the invention is very easy to use. The locator is placed on the creasing rule, the cover paper is removed and the press operated to move the creasing rule towards the cutting plate thereby transferring the matrix to the cutting plate. Retracting the creasing rule leaves the matrix fixed to the cutting plate. The center section 16 is then pulled out of the strip 10 leaving the matrix portion 12 defining channel 28 in place in precise register with the cutting rule.

As noted above, the weakened parts of the joint regions between the locator and matrix portions may be formed, such as by forming the thin webs 22 and 24, during the extrusion operations. In any event, the important features of the invention are that the matrix is formed of a single, unitary strip including locator and matrix portions integrally joined to each other along weakened portions of the strip.

Obviously, numerous modifications and variations of the present invention are possible in the light of the above teaching. It is therefore to be understood that within the scope of the claims appended hereto, the invention may vary from the particular embodiments disclosed herein.

What is claimed is:

1. A scoring die matrix for use with a press adapted for creasing or scoring card material including a stationary platen and a creasing rule fixed to a movable press member situated in opposed relationship to said stationary platen, comprising: an extruded unitary elongated strip having two portions, a matrix portion and a locator portion, formed integrally with each other, said locator portion formed with means for detachably connecting said scoring die matrix to said creasing rule, said matrix portion including a base facing said stationary platen when said scoring die matrix is connected to said creasing rule, said base having a layer of adhesive provided thereon and said matrix and locator portions being joined to each other at join regions, said join regions including weakened portions of the unitary strip between the locator portion and the matrix portion, wherein said weakened portions of said join regions include a pair of spaced, substantially parallel longitudinally extending weakened portions and said means for detachably connecting said scoring die matrix to said creasing rule includes a longitudinally extending slit formed in said locator portion substantially aligned with the space between said spaced weakened portions, whereby said creasing rule with said scoring die matrix connected thereto is advanced towards said stationary press platen until said scoring die matrix is pressed against said stationary press platen so that said adhesive layer on said base retains said scoring die matrix on said stationary platen whereupon said locator portion is separated from said matrix portion along said weakened portions of said join regions, said matrix portion with said locator portion separated therefrom forming a channel which is substantially aligned with said creasing rule.

2. A matrix as claimed in claim 1 in which the join regions between the locator portion and the matrix portion comprise a thin, continuous web.

3. A matrix as claimed in claim 1 in which the join regions between the locator portion and the matrix portion comprise a perforated web.

4. A matrix as claimed in claim 1 made from plastic material.

5. A matrix as claimed in claim 4 in which the plastic material comprises one of ethylene vinyl acetate, acrylo nitrile butadiene styrene, copolymers of acrylo nitrile butadiene styrene and styrene acrylo nitrile, polypropylene or polyvinyl chloride.

6. A matrix as claimed in claim 5 in which the plastic material is an acrylo nitrile butadiene styrene copolymer.

7. A matrix as claimed in claim 1 additionally provided with a metal foil base.

8. A matrix as claimed in claim 1 in which the layer of adhesive comprises a coating applied to said base or a double sided adhesive strip on a central tissue or carrier.

9. A matrix as claimed in claim 1 in which a base of the locator portion is recessed slightly from the base of the matrix portion so that adhesive may be applied to the base of the matrix portion without applying adhesive to the base of the locator portion.

* * * * *